(12) United States Patent
Jeong et al.

(10) Patent No.: US 12,486,294 B2
(45) Date of Patent: Dec. 2, 2025

(54) RADIOISOTOPE LABELED COMPOUND FOR IMAGING OR TREATMENT OF PROSTATE CANCER

(71) Applicant: SEOUL NATIONAL UNIVERSITY R&DB FOUNDATION, Seoul (KR)

(72) Inventors: Jae Min Jeong, Seoul (KR); Nadeem Ahmed Lodhi, Seoul (KR); Yun-sang Lee, Seoul (KR)

(73) Assignee: Seoul National University R&DB Foundation, Seoul (KR)

( * ) Notice: Subject to any disclaimer, the term of this patent is extended or adjusted under 35 U.S.C. 154(b) by 858 days.

(21) Appl. No.: 17/770,315

(22) PCT Filed: Oct. 22, 2020

(86) PCT No.: PCT/KR2020/014501
§ 371 (c)(1),
(2) Date: Apr. 20, 2022

(87) PCT Pub. No.: WO2021/080352
PCT Pub. Date: Apr. 29, 2021

(65) Prior Publication Data
US 2022/0402951 A1 Dec. 22, 2022

(30) Foreign Application Priority Data
Oct. 24, 2019 (KR) .................. 10-2019-0132984

(51) Int. Cl.
*C07F 13/00* (2006.01)
*C07B 59/00* (2006.01)

(52) U.S. Cl.
CPC .......... *C07F 13/005* (2013.01); *C07B 59/004* (2013.01); *A61K 2121/00* (2013.01); *A61K 2123/00* (2013.01); *C07B 2200/05* (2013.01)

(58) Field of Classification Search
CPC ............ A61K 2121/00; A61K 2123/00; A61K 47/00; A61K 47/02; A61K 47/22; A61K 51/00; A61K 51/04; A61K 51/0497; C07F 13/005; C07F 1/005; C07F 1/08; C07B 59/004; C07B 2200/05; A61P 35/00; C07C 275/24
See application file for complete search history.

(56) References Cited

U.S. PATENT DOCUMENTS

| | | | |
|---|---|---|---|
| 4,988,496 A * | 1/1991 | Srinivasan | C07D 405/12 534/10 |
| 2012/0269726 A1 | 10/2012 | Babich et al. | 424/1.85 |
| 2015/0246144 A1 | 9/2015 | Pomper et al. | A61K 51/0472 |

FOREIGN PATENT DOCUMENTS

| | | |
|---|---|---|
| CN | 1506372 | 12/2002 |
| KR | 10-1639599 | 7/2016 |
| KR | 10-2019-0114908 | 9/2020 |
| WO | 98/48848 | 11/1998 |
| WO | 2009/002529 | 12/2008 |
| WO | 2010/014933 | 2/2010 |
| WO | 2015/055318 | 4/2015 |
| WO | 2016/040179 | 3/2016 |
| WO | 2018/215627 | 11/2018 |

OTHER PUBLICATIONS

Alberto et al. "A novel organometallic aqua complex of technetium for the labeling of biomolecules: synthesis of [99mTc(OH2)3(CO)3]+ from [99mTcO4]− in aqueous solution and its reaction with a bifunctional ligand" J Am Chem Soc. 120:7987-7988, 1998.
Chen et al. "Preparation and biological evaluation of 99mTc-CO-MIBI as myocardial perfusion imaging agent" J Organometal Chem. 693:1822-1828, 2008.
Jones et al. "Biological studies of a new class of technetium complexes: the hexakis(alkylisonitrile)technetium(I) cations" Int J Nucl Med Biol. 11:225-234, 1984.
Lohdi, N.A. "Synthesis and In Vivo Biological Evaluation of 99mTc(I) Tri-carbonyl Based Radiopharmaceuticals for SPECT Imaging" Oct. 21, 2019, Ph. D. thesis, Seoul National University College of medicine) pp. 1-153.
Lodhi et al. "Development of 99mTc-labeled trivalent isonitrile radiotracer for folate receptor imaging" Bioorg Med Chem. 27:1925-1931, 2019.
Mizuno et al. "Purification-free method for preparing technetium-99m-labeled multivalent probes for enhanced in vivo imaging of saturable systems" J Med Chem. 59:3331-3339, 2016.
Mueller et al. "DOTA conjugate with an albumin-binding entity enables the first folic acid-targeted 177Lu-radionuclide tumor therapy" J Nucl Med 54:124-131, 2013.
Ruan et al. "Novel 99mTc labelled complexes with 2-nitroimidazole isocyanide: design, synthesis and evaluation as potential tumor hypoxia imaging agents" Med Chem Comm 9:988-994, 2018.
Wackers et al. "Technetium-99m hexakis 2-methoxyisobutyl. isonitrile: human biodistribution, dosimetry, safety, and preliminary comparison to thallium-201 for myocardial perfusion imaging" J Nucl Med. 30:301-311, 1989.

* cited by examiner

*Primary Examiner* — D. L. Jones
(74) *Attorney, Agent, or Firm* — Licata & Tyrrell P.C.

(57) ABSTRACT

The present invention relates to: a derivative in which glutamate-urea-Lysine (GUL) and isonitrile are linked by a linker; a radioisotope labeled compound comprising the derivative; and a pharmaceutical composition for treating and diagnosing prostate cancer, containing the derivative as an active ingredient. A derivative according to the present invention has high binding capacity for PSMA, which is expressed in prostate cancer, by acting as a multi-ligand through the binding of three or six derivatives to one atom of technetium or rhenium, has excellent stability in human serum when administered in vivo, and is excreted into the kidney rather than the hepatobiliary tract because of high water solubility so that a clear image of a prostate cancer tumor site can be obtained, and thus the present invention can be effectively usable as a pharmaceutical composition for treating or diagnosing prostate cancer.

14 Claims, 6 Drawing Sheets

RADIOISOTOPE LABELED COMPOUND FOR IMAGING OR TREATMENT OF PROSTATE CANCER

CROSS-REFERENCES TO RELATED APPLICATION

This patent application is the National Stage of International Application No. PCT/KR2020/014501 filed Oct. 22, 2020, which claims the benefit of priority under 35 U.S. C. § 119 from Korean Patent Application 10-2019-0132984 filed on Oct. 24, 2019, the contents of each of which are incorporated herein by reference in their entirety.

BACKGROUND OF THE INVENTION

1. Field of the Invention

The present invention relates to a derivative in which glutamate-urea-Lysine (GUL) and isonitrile are linked by a linker, a radioisotope labeled compound comprising the derivative, and a pharmaceutical composition for treating and diagnosing prostate cancer containing the derivative as an active ingredient.

2. Description of the Related Art

Prostate cancer is one of the most common urinary tract tumors worldwide. In the United States alone, about 380,000 people were diagnosed with prostate cancer in 1997, and 41,800 people died, showing the second highest number of deaths after lung cancer. In Korea, prostate cancer is rapidly increasing due to aging and westernization of diet, so early imaging diagnosis and treatment of prostate cancer has become a major issue not only in Korea but also worldwide.

Prostate cancer mainly starts in the tissues around the prostate, and as it grows, it can spread to other important organs in the body, such as bones and lungs. In the early stages of prostate cancer, there are few symptoms, but as the cancer grows, it can cause problems such as urethral compression or urinary tract obstruction, and it can be easily metastasized to the spine or pelvic bone, causing serious complications.

As a nuclear medicine diagnostic method for prostate cancer, an imaging method that indicates the presence and distribution of cancer by expressing biochemical changes occurring in tumor cells as tomographic images and three-dimensional images using radioactive isotope-labeled substances emitting gamma rays or positrons such as SPECT (Single Photon Emission Computed Tomography) or PET (Positron Emission Tomography) is used. Recently, as SPECT-CT/MRI and PET-CT/MRI combined with CT have been developed to improve cancer imaging performance, the imaging method is being spread more rapidly.

Radiopharmaceuticals used as imaging agents for prostate cancer use ligands that bind to proteins (Prostate Specific Membrane Antigen: PSMA) specifically expressed in prostate cancer. The most famous ligands that bind PSMA are peptide derivatives such as Glu-urea-Lys (GUL) or Glu-urea-Cys (GUC). Therefore, a radiopharmaceutical prepared by labeling a peptide ligand with an appropriate radioisotope can specifically image or treat PSMA-expressing prostate cancer in PET or SPECT.

Radioisotopes used to label various peptides mainly include alpha-ray-emitting nuclides, beta-ray-emitting nuclides, gamma-ray-emitting nuclides, and positron-emitting nuclides. Among them, alpha-ray and beta-ray-emitting nuclides are used for treatment, and gamma-ray and positron-emitting nuclides are used for diagnosis by nuclear imaging.

A method of labeling a ligand with a radioisotope includes a method of direct binding to the ligand, or a method of labeling by first binding a bifunctional chelating agent (BFCA) such as DTPA, DOTA, TETA, HYNIC, N2S2, MAG3 and the like to the peptide and then chelating the radioisotope. The method of direct binding is mainly used to bind radioiodine or F-18, and this method cannot bind various radioisotopes. Various metallic radioisotopes can be labeled by using a method using a bifunctional chelating agent (BFCA). The bifunctional chelating agent (BFCA) can be used in different types depending on the radioisotope or ligand.

TABLE 1

Bifunctional chelating agent (BFCA) used depending on the type of ligand peptide

| Group | Peptide | BFCA | Targeted disease |
|---|---|---|---|
| Somatostatin (SST) analogues | octreotide | DTPATETAHYNIC | tumor (neuro-endocrine) |
| | Tyr³-octreotide (Y3-TETA) | TETAHYNIC | tumor (neuro-endocrine) |
| | vapreotide (RC-160) | S-S (direct) HYNIC | tumor (neuro-endocrine) |
| BN/GRP analogues | BN | N2S2HYNIC | tumor |
| VIP analogues | VIP | MAG3 | tumor |
| RGD-containing peptides/RGD-peptidomimetics | | HYNIC | thrombosis |
| R-MSH analogues | CCMSH | S-S (direct) | tumor (breast, prostate) |
| SP analogues | SP | DATA | tumor |
| Chemotactic peptides | fMLF | HYNIC | Infection/inflammation |

The most widely used radioisotope for in vivo imaging is $^{99m}$Tc. It has a short half-life of 6 hours and emits only 140 keV of gamma rays, so excellent images can be obtained with a small amount of radiation in the body. It can also be produced in a generator, so it can be obtained conveniently and economically. With these advantages, it occupies most of the radioactive isotopes used in the nuclear medicine department of hospitals, so it is very important to develop a technetium-labeled radiopharmaceutical. As isotopes with chemical properties similar to technetium, there are $^{188}$Re and $^{186}$Re, which are used for treatment by emitting beta and gamma rays. Therefore, $^{99m}$Tc, $^{186}$Re or $^{188}$Re can be labeled and used for the same compound depending on the use. As technetium-labeled radiopharmaceuticals, numerous substances such as HMPAO and ECD for brain imaging, MDP, DPD and HDP for bone imaging, DTPA, MAG3 and DMSA for kidney imaging, mebrophenin, HIDA and DISIDA for hepatobiliary imaging, and gluconate for hydrogen sulfide imaging have been developed and used. On the other hand, technetium or rhenium is a metal belonging to a soft acid and forms a stable complex with a ligand belonging to a soft base. As a representative soft base compound, there is an isonitrile-based compound. It has been reported that a ligand having 6 isonitrile groups is stably bound to +1-valent technetium to finally form a +1-valent complex (non-patent reference 1. Jones A G, Abrams M J, Davison A, Brodack J W, Toothaker A K, Adelstein S J, Kassis A I, Biological studies of a new class of technetium complexes: the hexakis (alkylisonitrile)technetium(I) cations. Int J Nucl Med Biol. 11:225-234, 1984). Using this, a compound in which six methoxyisobutyl isonitrile (MIBI) was bound to technetium was prepared, which is ingested into the mitochondria of the myocardium and is widely used in myocardial imaging. A compound in which six MIBIs are bound is called cestamibi (non-patent reference 2. Wackers F J T, Berman D S, Maddahi J, Watson D D, Beller G A, Strauss H W, Boucher C A, Picard M, Holman B L, Fridrich R, Inglese E, Delaloye B, Bischof-Delaloye A, Camin L, McKusick K. Technetium-99m hexakis 2-methoxyisobutyl.isonitrile: human biodistribution, dosimetry, safety, and preliminary comparison to thallium-201 for myocardial perfusion imaging. J Nucl Med. 30:301-311, 1989).

A ligand belonging to the soft base is carbon monoxide (CO). CO also binds well with +1-valent technetium, and in aqueous solution, 3 CO molecules and 3 water molecules combine with +1-valent technetium (patent reference 1. WO 98/48848; non-patent reference 3. Alberto R, Schibli R, Egli A, Schubiger A P. A novel organometallic aqua complex of technetium for the labeling of biomolecules: synthesis of $[^{99m}Tc(OH_2)_3(CO)_3]^+$ from $[^{99m}TcO_4]^-$ in aqueous solution and its reaction with a bifunctional ligand. J Am Chem Soc. 120:7987-7988, 1998). This compound has been widely used to label other compounds because of its binding properties to various other ligands.

After that, there was a report that a +1-valent compound for myocardial imaging was synthesized by combining 3 CO molecules and 3 isonitrile molecules with +1-valent technetium, but it was not widely used (patent reference 2. CN 1506372A; non-patent reference 4. Chen X, Guo Y, Zhang Q, Hao G, Jia H, Liu B. Preparation and biological evaluation of 99mTc-CO-MIBI as myocardial perfusion imaging agent. J Organometal Chem. 693:1822-1828, 2008).

On the other hand, a multivalent compound in which 3 isonitrile ligands including RGD residues that bind to αvβ3 integrin expressed in angiogenesis sites and 3 CO molecules are bound to +1-valent technetium was developed by focusing on the fact that several ligands including isonitrile groups can bind to technetium (non-patent reference 5. Mizuno Y, Uehara T, Hanaoka H, Endo Y, Jen C W, Arano Y. Purification-free method for preparing technetium-99m-labeled multivalent probes for enhanced in vivo imaging of saturable systems. J Med Chem. 59:3331-3339, 2016). This showed that the isonitrile ligand bound in this way was sufficiently stable to act as a multivalent ligand. A multivalent ligand has the advantage of increasing binding strength compared to a single ligand. In the same way, a technetium compound of an isonitrile group including nitroimidazole has been reported (non-patent reference 6. Ruan Qing, Zhang X, Lin X, Duan X, Zhang J. Novel 99mTc labeled complexes with 2-nitroimidazole isocyanide: design, synthesis and evaluation as potential tumor hypoxia imaging agents. Med Chem Comm 9:988-994, 2018). In addition, a technetium compound of an isonitrile group including folic acid has been reported (non-patent reference 7. Lodhi N A, Park J Y, Hong M K, Kim Y J, Lee Y S, Cheon G J, Jeong J M. Development of 99mTc-labeled trivalent isonitrile radiotracer for folate receptor imaging. Bioorg Med Chem. 27:1925-1931, 2019).

US 2012/0269726 A1, US 2015/0246144 A1, WO 2015/055318 A1 and KR 10-1639599, the patents related to radiopharmaceuticals for prostate cancer imaging, describe a compound combining a GUl, derivative and a chelating agent using a linker is described. However, the compound has a hard base that is good for containing an isotope such as Ga-68 or Lu-177, a hard acid, so it is not suitable for labeling an isotope such as technetium or rhenium, a soft acid. In addition, WO 2010/014933 A2 describes a GUL derivative in which a halogen is introduced into a phenyl ring and then labeled with F-18 or 1-125, but the derivative cannot also be labeled with a metallic isotope such as technetium or rhenium.

The compounds in which radioactive isotopes are labeled to the above-mentioned bifunctional chelating M agents are water-soluble radiopharmaceuticals, and these water-soluble drugs are mainly excreted by the kidney. At this time, the compounds have a strong binding property to the kidney, so many remain in the kidney for a long time. Then, the absorbed dose of radiation of the kidneys increases, which limits the dosage when used for treatment, and thus the therapeutic effect may be reduced. Therefore, some methods are used to increase the intake by cancer cells by increasing the fat solubility, increasing the serum albumin binding rate, controlling the rate of excretion by the kidney, and increasing the concentration in the blood. In particular, there is a report of reducing kidney intake by inserting an albumin-binding site, phenyl iodide, into folic acid and chelate derivatives (non-patent reference 8. C Mueller, H Struthers, C Winiger, K Zhernosekov, R Schibli. DOTA conjugate with an albumin-binding entity enables the first folic acid-targeted 177Lu-radionuclide tumor therapy. J Nucl Med 54:124-131, 2013.)

Accordingly, the present inventors have been tried to develop radiopharmaceuticals effective for imaging and treating prostate cancer by labeling GUL ligand with technetium or rhenium to have a higher binding affinity to PSMA expressed on the surface of prostate cancer. As a result, the present inventors found that when a GUL derivative containing an isonitrile group was used, three or six GUL ligands bound to technetium or rhenium and had a high binding affinity to PSMA and that when administered in the body, the prostate cancer specific intake was increased, thereby improving the quality of the image and further enhancing the therapeutic effect. The present inventors have completed the present invention by confirming that the derivative can be effectively used as a pharmaceutical composition for the treatment or diagnosis of prostate cancer.

SUMMARY OF THE INVENTION

It is an object of the present invention to provide a derivative of GUL and isonitrile or a pharmaceutically acceptable salt thereof.

It is another object of the present invention to provide a labeled compound in which a metallic radioisotope is coordinated to the derivative of GUL and isonitrile or the pharmaceutically acceptable salt thereof.

It is another object of the present invention to provide a pharmaceutical composition for treating and diagnosing prostate cancer containing the labeled compound as an active ingredient.

It is another object of the present invention to provide a radiopharmaceutical for imaging of prostate cancer containing the derivative of GUL and isonitrile or the pharmaceutically acceptable salt thereof as an active ingredient.

It is another object of the present invention to provide a kit for the treatment or diagnosis of prostate cancer containing the derivative of GUL and isonitrile or the pharmaceutically acceptable salt thereof.

To achieve the above objects, the present invention provides a compound represented by the following formula 1 or a pharmaceutically acceptable salt or a complex thereof.

[Formula 1]

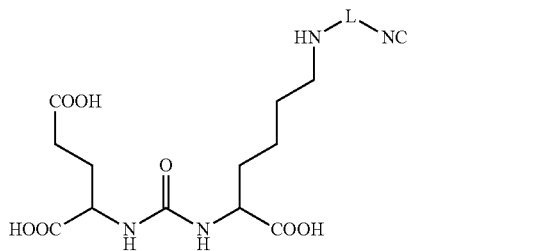

At this time, L is a linker.

The linker L can include at least one complex selected from the group consisting of straight or branched $C_{1-10}$ alkyl, $C_{4-10}$ aryl, urea, thiourea, triazole, monopeptide, dipeptide, tripeptide $C_{4-10}$ cycloalkyl, benzyl, halogenated benzyl, phenyl, halogenated phenyl, ether, thioether, amine, amide, ketone, ester, thioester, hydrazine, hydrazide, pentose and hexose.

The present invention also provides a radioisotope-labeled compound represented by the following formula 2 or a pharmaceutically acceptable salt thereof.

[Formula 2]

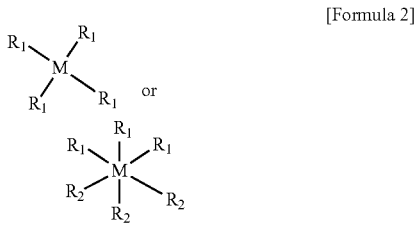

At this time, in formula 2 above,
M is a metal,
$R_1$ is

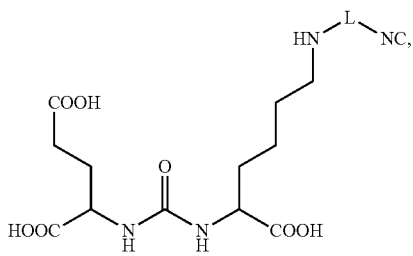

and
$R_2$ is $R_1$ or —CO.

The present invention also provides a pharmaceutical composition for the treatment or diagnosis of prostate cancer containing the labeled compound represented by formula 2 as an active ingredient.

The present invention also provides a radiopharmaceutical for imaging of prostate cancer containing the compound represented by formula 2 or the pharmaceutically acceptable salt thereof as an active ingredient.

The present invention also provides a kit for the treatment or diagnosis of prostate cancer containing the derivative of GUL and isonitrile or the pharmaceutically acceptable salt thereof.

The present invention also provides a kit for the treatment or diagnosis of prostate cancer containing the labeled compound represented by Formula 2 as an active ingredient including the compound represented by formula 1 or the pharmaceutically acceptable salt thereof.

The present invention also provides a compound represented by formula 2 or a pharmaceutically acceptable salt thereof for the use of preparation of a medicament for the diagnosis or treatment of prostate cancer.

The present invention also provides a use of a compound represented by formula 2 or a pharmaceutically acceptable salt thereof for the preparation of a medicament for the diagnosis or treatment of prostate cancer.

The present invention also provides a method for diagnosing or treating prostate cancer by administering the compound represented by formula 2 or the pharmaceutically acceptable salt thereof.

In addition, the present invention provides a method for obtaining radiation images by administering the compound represented by formula 2 or the pharmaceutically acceptable salt thereof.

Advantageous Effect

The GUL-isonitrile derivative and radioactive metal complex according to the present invention is simple to label, has high labeling efficiency, has excellent stability in human serum when administered to the body, binds well to PSMA expressed in prostate cancer, and has high water solubility, so it is excreted by the kidney rather than the hepatobiliary tract, so the intake is very small in the intestines. In addition, the GUL-isonitrile derivative and radioactive metal complex of the present invention accumulates in prostate cancer tissue and emits radiation from the prostate cancer tumor site, so it can be effectively used as a therapeutic or diagnostic pharmaceutical composition.

BRIEF DESCRIPTION OF THE DRAWINGS

As shown in FIG. 4A, the cancer tumor was located on the right shoulder indicated by the arrow, and although the radioactivity was slightly increased due to high radioactivity in the lower kidney, no clear intake was observed at both 1 hour and 3 hours after the injection. As shown in FIG. 4B, [$^{99m}$Tc]Tc-15 was not observed in the cancer tumor by injecting MIP-1072 with [$^{99m}$Tc]Tc-15 to selectively block PSMA.

As shown in FIG. 5, the cancer tumor was located on the right shoulder indicated by the arrow, and although the radioactivity was high in the lower kidney, the increase in radioactivity was evident even 1 hour after the injection. In particular, 4 hours after the injection, the surrounding radioactivity was low, and the intake was more distinct. As shown in FIG. 5B, [$^{99m}$Tc]Tc-16 was not observed in the cancer tumor by injecting MIP-1072 with [$^{99m}$Tc]Tc-16 to selectively block PSMA.

DESCRIPTION OF THE PREFERRED EMBODIMENTS

Figure 1A:
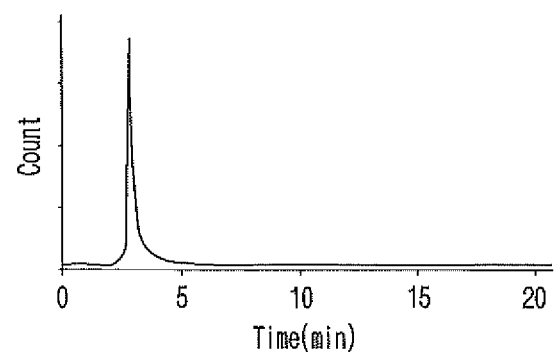
FIGS. 1A to 1C show the results of HPLC for confirming the labeling efficiency after radioisotope labeling. An Xterra RP18 3.5 μm (4.6 mm×100 mm) column was used, and solvent A (0.1% trifluoroacetic acid (TFA) aqueous solution) and solvent (acetonitrile) were used. A concentration gradient, starting with 100% solvent A at the beginning and reaching 100% solvent B after 30 minutes, was used and the flow rate was 3 mL/min. As a result, $[^{99m}Tc][Tc(H_2O)_3(CO)_3]^+$ and $[^{99m}Tc]Tc$-15 and $[^{99m}Tc]Tc$-16 according to the present invention are shown in FIGS. 1A, 1B, and 1C, respectively, and the labeling efficiency of $[^{99m}Tc]Tc$-15 and $[^{99m}Tc]Tc$-16 can be seen to be almost 100%.
Figure 1B:
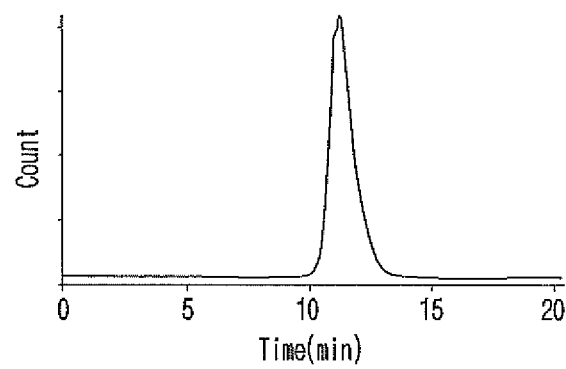
Figure 1C:
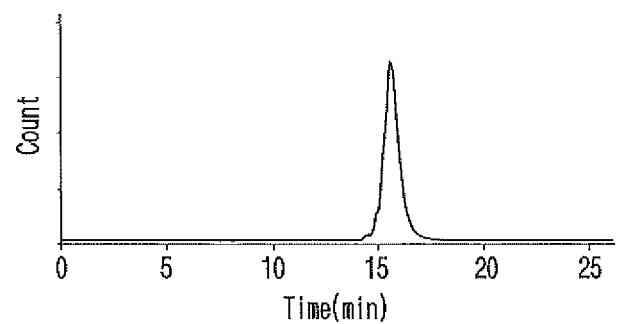

Hereinafter, the present invention is described in detail.

The embodiments of this invention can be modified in various other forms, and the scope of the present invention is not limited to the embodiments described below. It is well understood by those in the art who has the average knowledge on this field that the embodiments of the present invention are given to explain the present invention more precisely. In addition, the "inclusion" of an element throughout the specification does not exclude other elements, but may include other elements, unless specifically stated otherwise.

The present invention provides a compound represented by the following formula 1 or a pharmaceutically acceptable salt or a complex thereof.

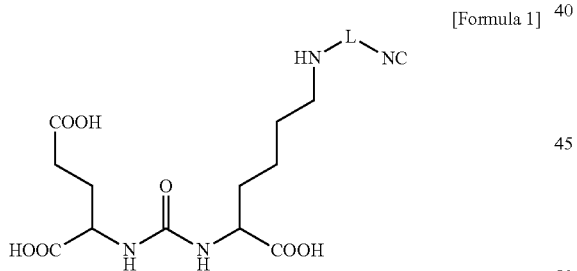

[Formula 1]

(In formula 1 above, L is a linker).

The linker L can include at least one complex selected from the group consisting of straight or branched $C_{1-10}$ alkyl, $C_{4-10}$ aryl, urea, thiourea, triazole, monopeptide, dipeptide, tripeptide $C_{4-10}$ cycloalkyl, benzyl, halogenated benzyl, phenyl, halogenated phenyl, ether, thioether, amine, amide, ketone, ester, thioester, hydrazine, hydrazide, pentose and hexose.

The linker connects the GUL portion that binds to prostate cancer cells and the isonitrile group that forms a complex with technetium. The GUL portion composed of Glutamate-urea-Lysine has a property of strongly binding to PSMA, an antigen that is frequently expressed in prostate cancer cells. Therefore, using such property, various bifunctional chelating agents can be combined with a linker to label a metallic radioisotope and used as a radiopharmaceutical, and such patents include KR 10-1639599, US 2012/0269726 A1, etc. These patents are all composed of chelating agents that are hard bases, so they are good for labeling metallic isotopes belonging to hard acids such as $^{68}$Ga, $^{111}$In, $^{177}$Lu and $^{90}$Y. In the present invention, an isonitrile group belonging to a soft base was introduced to be good for labeling such metallic isotopes as $^{99m}$Tc, $^{188}$Re and $^{186}$Re, which are the most widely used and marketable soft acids in nuclear medicine. In principle, any chemical bond may be used for the linker connecting GUL and the isonitrile group. However, if there is a group such as benzyl or benzyl iodide that can bind to albumin, the blood concentration can be maintained high for a long time, so it is more preferable because it can reduce kidney intake and increase cancer cell intake.

The present invention also provides a radioisotope-labeled compound represented by the following formula 2 or a pharmaceutically acceptable salt thereof.

[Formula 2]

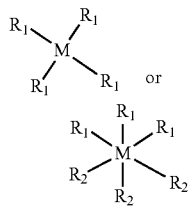

(In formula 2 above,
M is a radioactive metal,
$R_1$ is

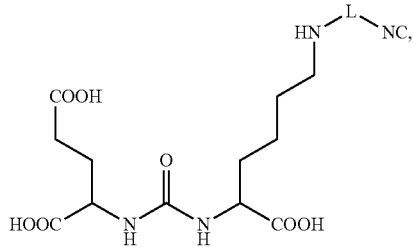

and
$R_2$ is $R_1$ or —CO).

At this time, the binding between $R_1$ and M is that the isonitrile group of R1 binds with M.

It is known that technetium or rhenium having an oxidation number of +1 binds to a ligand having 6 isonitrile groups or to a ligand having 3 CO molecules and 3 isonitrile groups to form a stable complex. Therefore, by forming an octahedral structure as shown in formula 2 above, a multivalent complex including 3 or 6 GULs can be synthesized. This multivalent structure is known to increase the targeting efficiency when administered in the body, especially due to increased binding force.

The present invention also provides a pharmaceutical composition for the treatment or diagnosis of prostate cancer containing the labeled compound represented by formula 2 as an active ingredient. For the diagnosis, $^{99m}$Tc, the most widely used radioactive isotope in nuclear medicine, is used, and for the treatment, $^{188}$Re or $^{186}$Re is used.

M may be copper (Cu), technetium (Tc) or rhenium (Re).

In another aspect, M may be $^{60}$Cu, $^{61}$Cu, $^{62}$Cu, $^{63}$Cu, $^{64}$Cu, $^{65}$Cu, $^{67}$Cu, $^{96}$Tc, $^{96m}$Tc, $^{97m}$Tc, $^{99m}$Tc, $^{101}$Tc, $^{186}$Re or $^{188}$Re.

The present invention also provides a radiopharmaceutical for imaging of prostate cancer containing the compound represented by formula 1 or formula 2 or the pharmaceutically acceptable salt thereof as an active ingredient. The radiopharmaceutical for imaging of prostate cancer includes a composition for the treatment or diagnosis of prostate cancer.

The present invention also provides a kit for the treatment or diagnosis of prostate cancer containing the labeled compound represented by Formula 2 as an active ingredient including the compound represented by formula 1 or the pharmaceutically acceptable salt thereof.

The compound represented by formula 1 of the present invention can be used as a form of a pharmaceutically acceptable salt, in which the salt is preferably acid addition salt formed by pharmaceutically acceptable free acids. The pharmaceutically acceptable salt refers to any organic or inorganic addition salt of the basic compound of formula 1 at a concentration having an effective action that is relatively non-toxic and harmless to the patient, and the side effects due to this salt do not reduce the beneficial efficacy of the basic compound of formula 1. For these salts, inorganic acids and organic acids can be used as free acids. Hydrochloric acid, bromic acid, nitric acid, sulfuric acid, perchloric acid, phosphoric acid, and the like can be used as inorganic acids, and citric acid, acetic acid, lactic acid, maleic acid, fumaric acid, gluconic acid, methanesulfonic acid, glycolic acid, succinic acid, tartaric acid, galacturonic acid, embonic acid, glutamic acid, aspartic acid, oxalic acid (D) or (L) malic acid, maleic acid, methanesulfonic acid, ethanesulfonic acid, 4-toluenesulfonic acid, salicylic acid, citric acid, benzoic acid, malonic acid, and the like can be used as organic acids. In addition, these salts include alkali metal salts (sodium salt, potassium salt, etc.) and alkaline earth metal salts (calcium salt, magnesium salt, etc.) and the like. For example, acetate, aspartate, benzate, besylate, bicarbonate/carbonate, bisulfate/sulfate, borate, camsylate, citrate, edisylate, esylate, formate, fumarate, gluceptate, gluconate, glucuronate, hexafluorophosphate, hybenzate, hydrochloride/chloride, hydrobromide/bromide, hydroiodide/iodide, isethionate, lactate, malate, maleate, malonate, mesylate, methylsulfate, naphthylate, 2-naphthylate, nicotinate, nitrate, orotate, oxalate, palmitate, pamoate, phosphate/hydrogen phosphate/dihydrogen phosphate, saccharate, stearate, succinate, tartrate, tosylate, trifluoroacetate, aluminum, arginine, benzathine, calcium, choline, diethylamine, diolamine, glycine, lysine, magnesium, meglumine, olamine, potassium, sodium, copper, tromethamine, zinc salt, and the like can be included as the acid addition salt, of which hydrochloride or +1-valent copper is preferable.

In addition, the compound represented by formula 1 of the present invention includes all salts, isomers, hydrates, solvates and complexes that can be prepared by conventional methods as well as the pharmaceutically acceptable salts.

The addition salt according to the present invention can be prepared by the conventional method known to those in the art. For example, the compound of formula 1 is dissolved in water-miscible organic solvent such as acetone, methanol, ethanol, or acetonitrile, to which excessive organic acid or acid aqueous solution of inorganic acid is added to induce precipitation or crystallization. Then, the solvent or the excessive acid is evaporated from the mixture, followed by drying the mixture to give addition salt or suction-filtering the precipitated salt to give the same.

The present invention also provides a labeled compound represented by formula 2 in which a metallic radioisotope is coordinated to a compound represented by formula 1 or a pharmaceutically acceptable salt thereof.

The metallic radioisotope is preferably $^{99m}$Tc, $^{188}$Re, or $^{186}$Re.

The present invention also provides a pharmaceutical composition for the treatment or diagnosis of prostate cancer containing the labeled compound as an active ingredient. In addition, the present invention provides a radiopharmaceutical for imaging of prostate cancer containing the labeled compound as an active ingredient.

Radioisotopes mainly include alpha-ray-emitting nuclides, beta-ray-emitting nuclides, gamma-ray-emitting nuclides, and positron-emitting nuclides. Among them, alpha-ray and beta-ray-emitting nuclides are used for treatment, and gamma-ray and positron-emitting nuclides are used for diagnosis by nuclear imaging. When the pharmaceutical composition according to the present invention is used for imaging of prostate cancer, the radioactive isotope of the labeled compound is preferably $^{99m}$Tc, and when used for the treatment of prostate cancer, it is preferably $^{188}$Re or $^{186}$Re.

When administered to the body, the pharmaceutical composition according to the present invention has excellent stability in human serum, binds well to PSMA competitively expressed in prostate cancer, and has excellent PSMA inhibitory efficacy at low concentrations. In addition, since the composition is highly water-soluble, it is excreted by the kidney rather than the hepatobiliary tract, and is ingested into the prostate cancer tissue to emit radiation to the prostate cancer tumor site. Therefore, the composition of the present invention can be effectively used as a pharmaceutical composition for the treatment or diagnosis of prostate cancer.

The present invention provides a kit for the treatment or diagnosis of prostate cancer labeled with a metallic radioisotope in a pharmaceutically acceptable non-pyrogenic sterile form, containing the compound represented by formula 1 or the pharmaceutically acceptable salt thereof.

Specifically, the kit for the treatment or diagnosis of prostate cancer according to the present invention contains 10 ng to 100 mg of the compound represented by formula 1 above.

In order to conveniently label the metallic radioisotope to the compound represented by formula 1, the kit is prepared by adding the compound represented by formula 1, an appropriate buffer solution, and a reducing agent in a liquid state in advance, dispensing it into pharmaceutically desirable sterile vials and sealing thereof. It can be stored in refrigeration, freezing or freeze-drying, and can be usefully used when necessary.

At this time, the kit can be prepared by adding 0.01 mL to 10 mL of a buffer solution having a pH of 1 to 9 and a concentration of 1 µM to 10 M to control the hydrogen ion concentration during isotope labeling, and sealing thereof in a dissolved state, frozen state or freeze-dried state.

In addition, as the buffer solution, acetic acid, phosphoric acid, citric acid, fumaric acid, ascorbic acid, butyric acid, succinic acid, tartaric acid, carbonic acid, glucoheptonic acid, gluconic acid, glucuronic acid, glucaric acid, boric acid or a sodium salt or potassium salt thereof is preferred.

The kit of the present invention can include a reducing agent for reducing technetium or rhenium in a +7-valent state to a +1-valent state. As the reducing agent, tin chloride is most widely used, and NaBH4, ascorbic acid and the like can also be used.

Further, the kit of the present invention can additionally include an antioxidant. The antioxidant is to prevent the compound represented by formula 1 labeled with a radioactive isotope from being deteriorated by radiation decomposition. The antioxidant is preferably vitamin C or gentisic acid, and the kit of the present invention preferably contains 0 to 500 mg per unit dose.

The kit can be supplemented with buffered sterile vials, saline, syringes, filters, columns and other auxiliary devices to prepare injectable solutions for use by a clinical pathologist or technician. It is well known to those in the art that the kit can be changed and modified according to the patient's individual needs or diet, as well as changes in the form in which the radioisotope can be provided or obtained.

In addition, a radioisotope of 0.1 to 500.1 to 500 mCi per 1 mg of the compound represented by formula 1 can be added to the kit immediately before use and reacting for 0.1 to 30 minutes to prepare a radioisotope-labeled compound.

Herein after, the present invention will be described in detail by the following examples and experimental examples.

However, the following examples and experimental examples are only for illustrating the present invention, and the contents of the present invention are not limited thereto.
Non-Radioactive Compounds Purified by RP-HPLC RP-HPLC was performed using a Gilson, 506C system interface, a 155 UV/VIS detector (dual wavelength 220, 254 nm) and 321 pumps. Operation of the Gilson HPLC system was controlled using Trilution software. Purification of intermediates and final compounds was performed using a semi-preparative XTerra RP18 10 µm (10 mm×250 mm) column (Waters Co., U.S.A). The mobile phase consisted of 0.1% TFA/water (solvent A) and acetonitrile (solvent B) (gradient method), and the flow rate was as follow: 5 mL/min 0-40 min, 0-100% B (method 1), 3 mL/min, 0-5 min, 0% B; 5-30 min, 0-100% B (method 2), 5 mL/min, 0-35 min, 0-100% B (method 3), 5 mL/min, 0-40 min, 0-100% B (method 4), 3 mL/min, water (solvent A), acetonitrile (solvent B) 0-5 min gradient method, 3 mL/min, 0% B; 5-40 min, 0-100% B (method 5), or 0-30 min, 10-100% B (method 6).

<Example 1> Preparation of (3S)-22-isocyano-5,13,20-trioxo-4,6,12,19-tetrazazadocosane-1,3,7-tricarboxylic Acid (15)

The GUL-NC compound 15 was prepared according to reaction formulas 1 and 2 below.

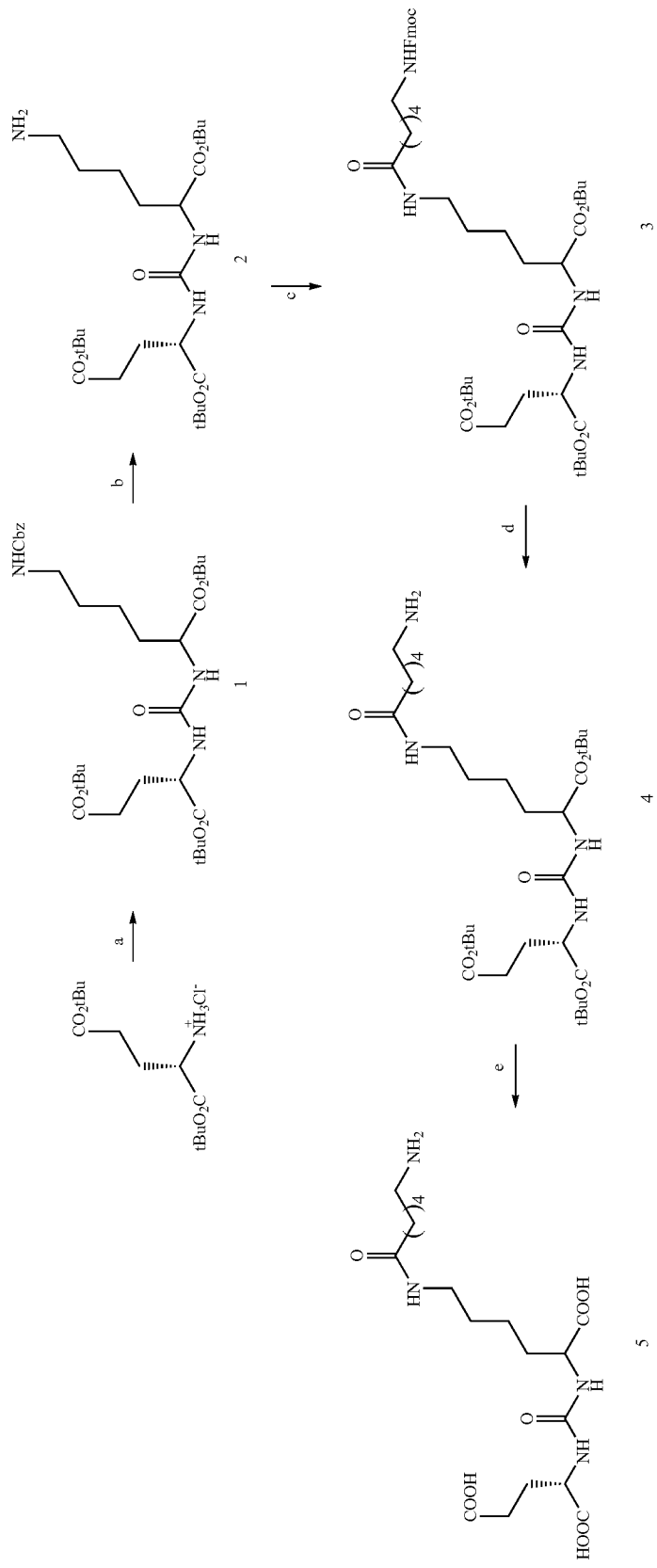

<sup>a</sup>Reagents and reaction conditions: (a) Cbz-Lys-Ot-Bu, triphosgene, −78° C. RT, 18 h (b) 10% Pd/C, methanol, 18 h (c) Fmoc-6-Ahx-OH, HBTU, DIPEA, 0° C. RT, overnight (d) 20% piperidine/DMF, 1 h (e) TFA:DCM (1:1), 18 h.

with saturated NaHCO$_3$ (1×50 mL) and water (2×50 mL), and finally washed with brine (1×30 mL). The organic layer was separated, dried over anhydrous sodium sulfate, concentrated under reduced pressure, and purified by silica gel

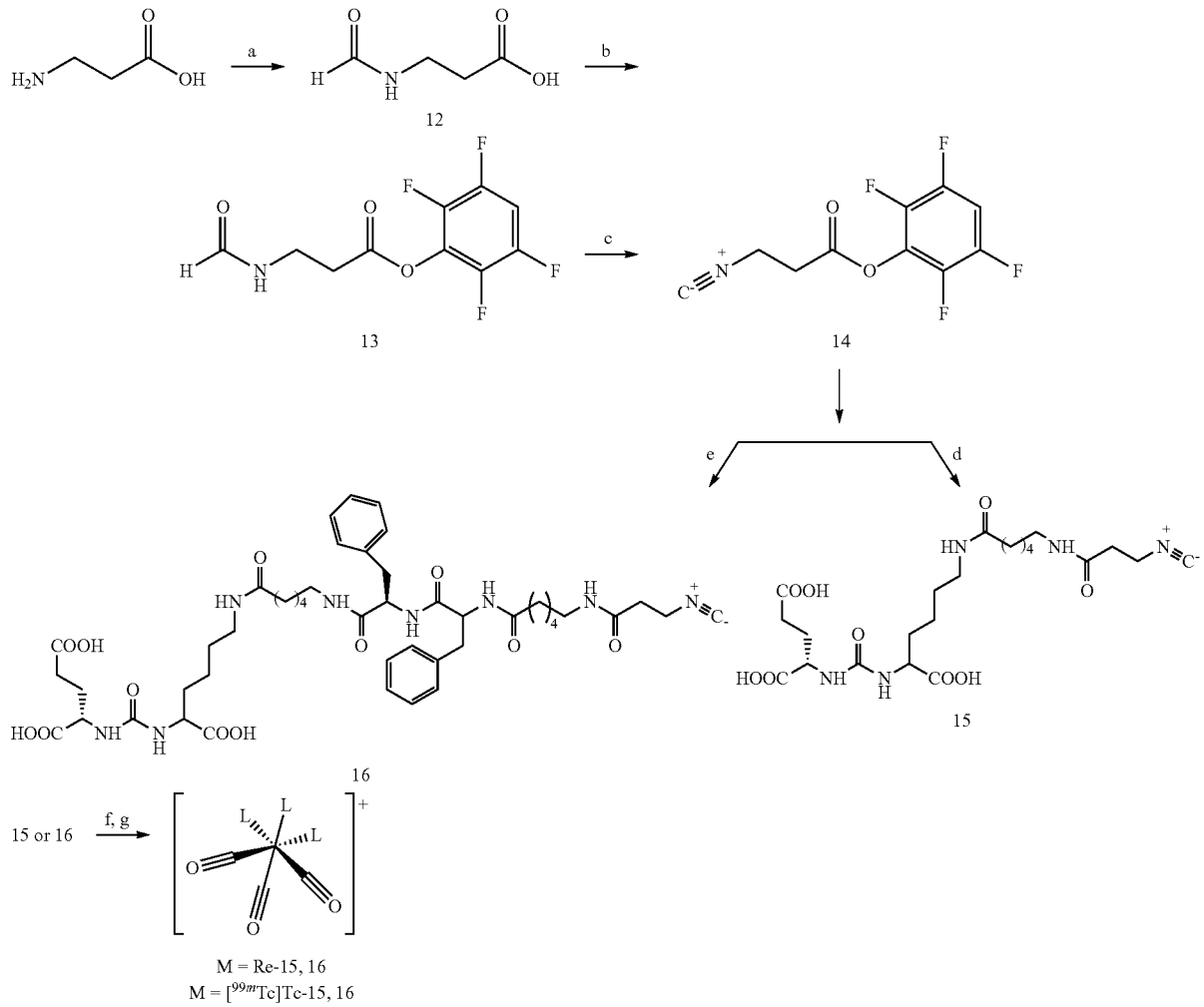

<sup>a</sup>Reagents and reaction conditions (a) formic acid, acetic anhydride, refluxed, 3 h (b) 2,3,5,6-tetrafluorophenol, DCC, DMF, RT, 24 h (c) triphosgene, DCM, TEA, 0° C., 1.5 h (d) 5, DIPEA, rt, 5 h (e) 10, DIPEA, rt, 5 h (f) [Re(CO)$_3$(H$_2$O)$_3$]Br (g) [$^{99m}$Tc]Tc(H$_2$O)$_3$(CO)$_3$]$^+$.

Step 1-1: Preparation of tri-tert-butyl (13S)-3,11-dioxo-1-phenyl-2-oxa-4,10,12-triazapentadecane-9,13,15-tricarboxylate (1)

L-glutamic acid di-tert-butyl ester hydrochloride (2.3 g, 7.88 mmol) dissolved in anhydrous DOM (60 mL) was added to TEA (2.6 mL, 25.7 mmol) at 78° C., followed by stirring in a nitrogen environment for 30 minutes. Triphosgene (0.8 g, 2.6 mmol) was added thereto dropwise for one hour, and after stirring the mixture at room temperature for one hour, N'-Cbz-L-lysine-tert-butyl ester (1.6 g, 4.7 mmol) in DOM (20 mL) containing TEA (0.4 mL, 4.7 mmol) was added. The mixture was reacted overnight (18 hours). Upon completion of the reaction, the organic layer was washed column chromatography using DCM and methanol (95:5, v/v) to give a target compound as a colorless oil (1.9 g, 66%).

$^1$H NMR (500 MHz, CDCl$_3$) δ 7.37-7.27 (m, 5H), 5.13-5.07 (m, 2H), 4.32 (td, J=8.4, 4.8 Hz, 2H), 3.23-3.10 (m, 2H), 2.33-2.23 (m, 2H), 1.90-1.70 (m, 2H), 1.66-1.46 (m, 4H), 1.46-1.26 (m, 31H). ESI-MS, (m/z): [M+H]$^+$, 622.

Step 1-2: Preparation of di-tert-butyl ((6-amino-1-(tert-butoxy)-1-oxohexane-2-yl)carbamoyl)-L-glutamate (2)

10% Pd/C (100 mg) was added to a solution of the compound 1 (1.5 g, 2.4 mmol) in methanol (20 mL). The suspension was stirred in a hydrogen environment for 18 hours. Upon completion of the reaction, Pd/C was removed by passing the reactant through Celite®. The obtained filtrate was concentrated under reduced pressure to give a target compound as a colorless oil that slowly hardened for a certain period of time (quantitative yield). Then, the next step was carried out without further purification.

¹H NMR (500 MHz, CDCl₃) δ 4.31-4.22 (m, 2H), 2.34-2.30 (m, 2H), 1.89-1.77 (m, 2H), 1.77-1.62 (m, 4H), 1.58-1.47 (m, 2H), 1.46-1.28 (m, 29H). ESI-MS, (m/z): [M+H]⁺, 488.

Step 1-3: Preparation of tri-tert-butyl (20S)-1-(9H-fluorene-9-yl)-3,10,18-trioxo-2-oxa-4,11,17,19-tetrazadocosane-16,20,22-tricarboxylate (3)

Fmoc-6-Ahx-OH (505 mg, 1.43 mmol) in DMF (15 mL) and DIPEA (1 mL, 3.5 mmol) were added to a solution of the compound 2 (500 mg, 1.0 mmol) and stirred at 0° C. for 10 minutes in an inert environment. HBTU (585 mg, 1.5 mmol) in DMF (5 mL) was added dropwise thereto, and the reaction mixture was stirred at room temperature for 18 hours. Upon completion of the reaction, ethyl acetate (50 mL) was added thereto, and the organic layer was washed with water (3×30 mL), dried over Na₂SO₄, and then concentrated under reduced pressure. The product was purified by silica gel column chromatography using DCM/methanol (97:3, v/v) to give the product 3 as a white solid (494 mg, 60%).

¹H NMR (500 MHz, CDCl₃) δ 7.78-7.74 (m, 2H), 7.60 (d, J=7.4 Hz, 2H), 7.42-7.37 (m, 2H), 7.31 (td, J=7.5, 1.2 Hz, 2H), 4.39 (dt, J=10.1, 5.2 Hz, 2H), 4.36-4.26 (m, 2H), 4.25-4.18 (m, 1H), 3.38-3.06 (m, 4H), 2.32 (tdd, J=13.4, 9.3, 6.3 Hz, 2H), 2.19 (dd, J=13.8, 6.6 Hz, 2H), 2.11-2.03 (m, 2H), 1.88-1.75 (m, 2H), 1.58-1.33 (m, 37H). ESI-MS, (m/z): [M+H]⁺, 823.

Step 1-4: Preparation of di-tert-butyl ((6-(6-aminohexaneamido)-1-(tert-butoxy)-1-oxohexane-2-yl)carbamoyl)-L-glutamate (4)

A solution of the compound 3 (500 mg, 0.6 mmol) was dissolved in 20% piperidine/DMF (1 mL), followed by stirring at room temperature for one hour. The solvent was removed in vacuo, and the product was purified by HPLC (method 1) to give the product 4 as a white solid (306 mg, 80%).

¹H NMR (500 MHz, CDCl₃) δ 4.18 (p, J=5.0 Hz, 2H), 2.32 (t, J=7.5 Hz, 2H), 2.28-2.22 (m, 2H), 2.09-1.85 (m, 2H), 1.69 (ddd, J=24.0, 18.3, 11.1 Hz, 6H), 1.58-1.23 (m, 37H). ESI-MS, (m/z): [M+H]⁺, 601.

Step 1-5: Preparation of ((5-(6-aminohexaneamido)-1-carboxypentyl)carbamoyl)-L-glutamate (5)

The product 4 (200 mg, 0.33 mmol) was dissolved in a mixture of TFA and DCM (2 mL, 1:1 v/v) and then stirred at room temperature overnight. Upon completion of the reaction, the solvent was removed under reduced pressure, and the residue was purified by HPLC (method 2) to give the product 5 as a white solid (56, 39%).

¹H NMR (500 MHz, Methanol-d₄) δ 4.27 (ddd, J 31.1, 8.6, 5.0 Hz, 2H), 3.17 (t, J=6.8 Hz, 2H), 2.91 (t, J=7.6 Hz, 2H), 2.40 (ddd, J=8.5, 6.8, 4.2 Hz, 2H), 2.20 (t, J=7.3 Hz, 2H), 1.71-1.60 (m, 10H), 1.45-1.35 (m, 4H). (ESI-MS, (m/z): [M+H]⁺, 433.

Step 2-1: Preparation of 3-formamidopropanoic Acid (12)

Acetic anhydride (25 mL) was added dropwise to a solution of b-alanine (5 g, 48.5 mmol) in formic acid (40 mL). After the mixture was heated for 3 hours, the solvent was removed in vacuo and cooled diethyl ether (30 mL) was added to give a solidified oily residue. After the mixture was heated for 3 hours, the solvent was removed in vacuo and cooled diethyl ether (30 mL) was added to give a solidified oily residue. The residue was purified by silica gel chromatography (DCM:methanol, 4:1, v/v) to give the compound 12 as a white solid (3 g, 55%).

¹H NMR (300 MHz, DMSO-d₆) δ 7.98 (s, 1H), 3.26 (t, J=6.8, 2H), 2.39 (t, J=6.8 Hz, 2H).

Step 2-2: Preparation of 2,3,5,6-tetrafluorophenyl 3-formamidopropanoate (13)

A solution of the compound 12 (500 mg, 4.27 mmol) was mixed with TFP (780 mg, 4.7 mmol) dissolved in anhydrous DMF (10 mL), and then cooled to 0° C. DCC in DMF (3 mL) was added dropwise for 10 minutes. The reaction mixture was stirred in an ice bath for 10 minutes and then stirred at room temperature for 24 hours. The resulting N,N-dicyclehexylurea was removed by filtration, and ethyl acetate (50 mL) was added to the filtrate. The organic layer was washed with water (40 mL×3), dried over Na₂SO₄ and then concentrated in vacuo. The product was purified by silica gel chromatography (ethyl acetate:hexane, 3:2, v/v) to give the product 13 as a white solid (680 mg, 60%).

¹H NMR (300 MHz, CDCl₃) δ 8.21 (s, 1H), 7.09-6.95 (m, 1H), 3.72 (t, 5.9, 2H), 2.99 (t, J=5.9 Hz, 2H).

Step 2-3: Preparation of 2,3,5,6-tetrafluorophenyl 3-isocyanopropanoate (14)

The compound 13 (2 g, 7.7 mmol) was dissolved in ice-cold anhydrous DCM (50 mL), and TEA (2.7 mL, 19.25 mmol) was added thereto, followed by stirring for 10 minutes in a nitrogen environment. Triphosgene (913 mg, 3.1 mmol) was added dropwise thereto over 30 minutes. The mixture was stirred at 0° C. for 1.5 h. Upon completion of the reaction, DCM (20 mL) was added and the organic layer was washed sequentially with saturated NaHCO₃ (50 mL×1), water (50 mL×2) and brine (20 mL×1). The separated organic layer was dried over Na₂SO₄ and concentrated under reduced pressure. The residue was purified by silica gel column chromatography using hexane and ethyl acetate (4:1, v/v) to give the product 14 as a Light yellow solid (1.2 g, 60%).

¹H NMR (300 MHz, Chloroform-d) δ 6.98 (m, 1H), 3.77 (t, J=6.8 Hz, 2H), 3.07 (t, J=6.8 Hz, 2H).

Step 2-4: Preparation of (3S)-22-isocyano-5,13,20-trioxo-4,6,12,19-tetrazazadocosane-1,3,7-tricarboxylic Acid (15)

A solution of the compound 5 (90 mg, 0.2 mmol) and DIPEA (2.5 eq) in anhydrous methanol (2 mL) was stirred at room temperature for 10 minutes. The compound 14 (77 mg, 0.3 mmol) was dissolved in anhydrous methanol (1 mL) and then added dropwise thereto, followed by stirring in a nitrogen environment for 5 hours. After the solvent was removed using a vacuum concentrator, the product was purified by RP-HPLC (method 5), and lyophilized under reduced pressure to give the product 15 as a white solid (35 mg, 34%).

¹H NMR (500 MHz, Methanol-d4) δ 4.23 (ddd, J=18.8, 8.6, 4.9 Hz, 2H), 3.13 (t, J=6.7 Hz, 2H), 2.87 (t, J=7.7 Hz, 2H), 2.40-2.31 (m, 2H), 2.16 (t, J=7.3 Hz, 2H), 1.90-1.72 (m, 2H), 1.66-1.27 (m, 14H). ESI-MS, (m/z): [M+H]+, 514.

<Example 2> Preparation of (3S,21R)-21,24-dibenzyl-35-isocyano-5,13,20,23,26,33-hexaoxo-4,6,12,19,22,25,32-heptaazapentatriacontane-1,3,7-tricarboxylic Acid (16)
The GUL-NC compound 16 was prepared according to reaction formulas 2 and 3 below.
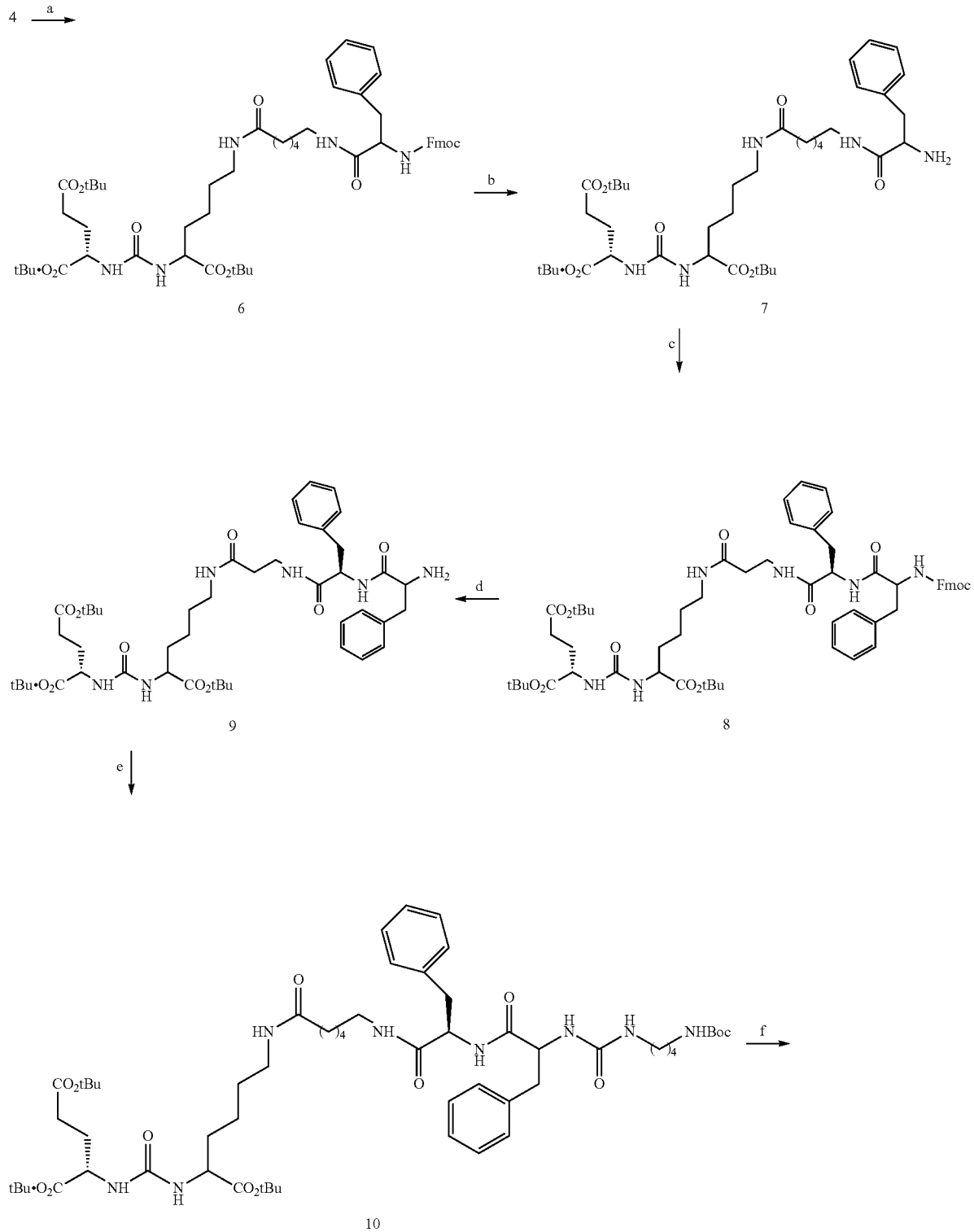

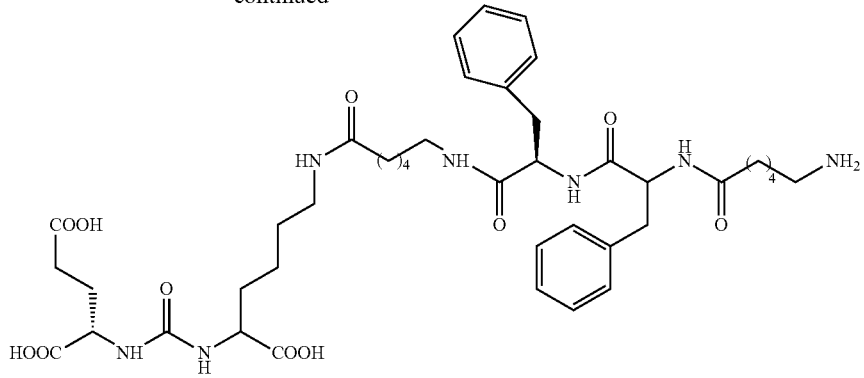

11

Reagents and reaction conditions (a) Fmoc-Phe-OH, HBTU, DIPEA, 0° C.-RT overnight (b) 20% piperidine/DMF, 1 h (c) Fmoc-Phe-OH, HBTU, DIPEA, 0° C.-RT overnight (d) 20% piperidine/DMF, 1 h (e) Boc-6-Ahx-OH, HBTU, DIPEA, 0° C.-RT overnight (f) TFA:DCM (1:1, v/v).

Step 3-1: Preparation of tri-tert-butyl (23S)-5-benzyl-1-(9H-fluorene-9-yl)-3,6,13,21-tetraoxo-2-oxa-4,7,14,20,22-pentaazapentacosane-19,23,25-tricarboxylate (6)

The compound 4 (800 mg, 1.33 mmol) was dissolved in a mixture of Fmoc-Phe-OH (515 mg, 1.33) and (0.8 mL, 4.65 mmol) in DMF (6 mL), cooled to 0° C., and stirred for 10 minutes. HBTU (1.0 g, 2.7 mmol) in DMF (2 mL) was added dropwise thereto, and then the reaction mixture was stirred at room temperature for 18 hours. Upon completion of the reaction, ethyl acetate (20 mL) was added thereto, and the organic layer was washed with water (3×40 mL), dried over $Na_2SO_4$ and concentrated under reduced pressure. The product was purified by silica gel column chromatography using DOM and methanol (96:4, v/v) to give a target compound as a white solid (839 mg, 65%).
$^1$H NMR (500 MHz, $CDCl_3$) δ 7.75 (dt, J=7.6, 0.9 Hz, 2H), 7.39 (t, J=7.4 Hz, 2H), 7.30-7.20 (m, 9H), 4.52-4.34 (m, 4H), 4.30 (t, J=9.1 Hz, 1H), 4.18 (t, J=7.1 Hz, 1H), 3.17 (d, J=6.4 Hz, 2H), 3.06 (d, J=7.2 Hz, 2H), 2.37-2.27 (m, 2H), 2.26-2.01 (m, 4H), 1.89-1.74 (m, 2H), 1.68-1.56 (m, 2H), 1.55-1.22 (m, 37H). ESI-MS, (m/z): [M+H]$^+$, 971.

Step 3-2: Preparation of tri-tert-butyl (3S)-21-amino-5,13,20-trioxo-22-phenyl-4,6,12,19-tetrazazadocosane-1,3,7-tricarboxylate (7)

The compound 6 (300 mg, 0.3 mmol) was dissolved in 20% piperidine/DMF (1 mL) and stirred at room temperature for 1 hour. The solvent was removed in vacuo and purified by HPLC (method 3) to give a target compound as a white solid (179 mg, 80%).
$^1$H NMR (500 MHz, $CDCl_3$) δ 7.28 (d, J=1.8 Hz, 1H), 7.26-7.20 (m, 4H), 4.33 (t, J=7.3 Hz, 1H), 4.24 (dt, J=8.7, 5.3 Hz, 2H), 3.35-3.08 (m, 6H), 2.31 (td, J=7.4, 6.6, 1.7 Hz, 2H), 2.16 (t, J=6.9 Hz, 2H), 1.66-1.50 (m, 4H), 1.49-1.28 (m, 37H). ESI-MS, (m/z): [M+H]$^+$, 748.

Step 3-3: Preparation of tri-tert-butyl (8R,26S)-5,8-dibenzyl-1-(9H-fluorene-9-yl)-3,6,9,16,24-pentaoxo-2-oxa-4,7,10,17,23,25-hexaazaoctacosane-22,26,28-tricarboxylate (8)

The compound 7 (526 mg, 0.7 mmol) was dissolved in a mixture of Fmoc-Phe-OH (299 mg, 0.7 mmol) and DIPEA (0.43 mL, 4.65 mmol) in DMF (3 mL), cooled to 0° C., and stirred for 10 minutes. HBTU (530 mg, 1.4 mmol) in DMF (2 mL) was added dropwise thereto, and then the reaction mixture was stirred at room temperature for 18 hours. Upon completion of the reaction, ethyl acetate (30 mL) was added thereto, and the organic layer was washed with water (3×40 mL), dried over $Na_2SO_4$ and concentrated under reduced pressure. The product was purified by silica gel column chromatography using DCM and methanol (96:3, v/v) to give the compound 8 as a white solid (531 mg, 68%).
$^1$H NMR (500 MHz, $CDCl_3$) δ 7.51-7.46 (m, 2H), 7.39 (t, J=7.4 Hz, 2H), 7.30-7.11 (m, 14H), 4.68 (d, J=7.7 Hz, 1H), 4.51-4.29 (m, 4H), 4.21 (t, J=8.9 Hz, 1H), 4.14 (t, J=7.2 Hz, 1H), 3.29-2.80 (m, 8H), 2.37-2.21 (m, 4H), 2.10-2.01 (m, 2H), 1.89-1.74 (m, 2H), 1.62-1.26 (m, 37H). ESI-MS, (m/z): [M+H]$^+$, 1118.

Step 3-4: Preparation of tri-tert-butyl (3S,21R)-24-amino-21-benzyl-5,13,20,23-tetraoxo-25-phenyl-4,6,12,19,22-pentaazapentacosane-1,3,7-tricarboxylate (9)

The compound 8 (300 mg, 0.3 mmol) was dissolved in 20% piperidine/DMF solution (1 mL) by stirring at room temperature for 1 hour. The solvent was removed in vacuo and the product was purified by HPLC (method 4) to give the product 9 as a white solid (215 mg, 90%).
$^1$H NMR (500 MHz, $CDCl_3$) δ 7.25-7.09 (m, 10H), 4.58 (q, J=7.6 Hz, 1H), 4.30 (d, J=10.3 Hz, 2H), 3.30 (dd, J=13.5, 6.9 Hz, 1H), 3.21-3.00 (m, 6H), 2.93-2.83 (m, 1H), 2.36-2.22 (m, 2H), 2.10 (dtt, J=35.8, 14.2, 7.6 Hz, 4H), 1.86-1.67 (m, 2H), 1.49-1.14 (m, 37H). ESI-MS, (m/z): [M+H]$^+$, 896.

Step 3-5: Preparation of tri-tert-butyl (16R,34S)-13,16-dibenzyl-2,2-dimethyl-4,11,14,17,24,32-hexaoxo-3-oxa-5,12,15,18,25,31,33-heptaazahexatriacontane-30,34,36-tricarboxylate (10)

A solution of the compound 9 (150 mg, 0.2 mmol) was mixed with Boc-6-Ahx-OH (42 mg, 0.2 mmol) and DIPEA (0.1 mL, 0.6 mmol), dissolved in DMF (2 mL), and then cooled to 0° C. HBTU (127 mg, 1.4 mmol) in DMF (1 mL) was added dropwise thereto, and then the reaction mixture was stirred at room temperature for 18 hours. Upon completion of the reaction, ethyl acetate (15 mL) was added thereto, and the organic layer was washed with water (3×20 mL), dried over $Na_2SO_4$ and concentrated under reduced pressure. The mixture was purified by silica gel column chromatography using DCM and MeOH (96:3, v/v) to give the product 10 as a white solid (155 mg, 70%).

$^1$H NMR (500 MHz, $CDCl_3$) δ 7.26-7.10 (m, 10H), 4.74-0.58 (m, 3H), 4.45 (q, J=6.5 Hz, 2H), 3.25-2.82 (m, 9H), 2.39-2.15 (m, 5H), 2.09 (dt, J=13.0, 6.5 Hz, 4H), 1.92-1.71 (m, 2H), 1.68-1.30 (m, 52H). ESI-MS, (m/z): $[M+H]^+$, 1109.

Step 3-6: Preparation of (3S,21R)-31-amino-21,24-dibenzyl-5,13,20,23,26-pentaoxo-4,6,12,19,22,25-hexaazatriacontane-1,3,7-tricarboxylic Acid (11)

A solution of the compound 10 (50 mg, 0.05) was dissolved in a mixture of TFA and DCM (2 mL, 1:1, v/v), and stirred at room temperature overnight. Upon completion of the reaction, the solvent was removed under reduced pressure, and the residue was purified by HPLC (method 4) to give the product 11 as a white solid (17 mg, 44%).

$^1$H NMR (500 MHz, Methanol-d4) δ 7.34-7.11 (m, 10H), 4.69-4.47 (m, 2H), 4.30 (ddd, J=14.8, 8.4, 4.9 Hz, 2H), 3.21-3.13 (m, 2H), 3.08 (ddt, J=13.4, 6.8, 2.9 Hz, 4H), 2.99-2.74 (m, 4H), 2.41 (ddd, J=8.2, 6.9, 1.9 Hz, 2H), 2.21-2.08 (m, 4H), 1.96-1.77 (m, 2H), 1.61 (s, 2H), 1.58-1.12 (m, 16H). ESI-MS, (m/z): $[M+H]^+$, 841.

Step 3-7: Preparation of (3S,21R)-21,24-dibenzyl-35-isocyano-5,13,20,23,26,33-hexaoxo-4,6,12,19,22,25,32-heptaazapentatriacontane-1,3,7-tricarboxylic Acid (16)

DIPEA (2.5 eq) was added to a solution of the compound 11 (35 mg, 0.039 mmol) in anhydrous methanol (1 mL), followed by stirring at room temperature for 10 minutes. A solution of the compound 14 (14 mg, 0.05 mmol) in methanol (1 mL) was added thereto and stirred for 5 hours. Upon completion of the reaction, the solvent was removed using a vacuum concentrator and purified by HPLC (method 6) to give the product 16 as a white solid (14 mg, 40%).

$^1$H NMR (500 MHz, Methanol-d4) δ 7.22 (dq, J=14.6, 7.0 Hz, 10H), 4.56 (ddd, J=14.1, 8.9, 6.0 Hz, 2H), 4.24 (td, J=7.7, 4.8 Hz, 2H), 3.25-2.88 (m, 12H), 2.54 (s, 2H), 2.38 (ddd, J=8.7, 6.6, 2.7 Hz, 2H), 2.17-2.06 (m, 4H), 1.59 (ddd, J=30.6, 14.5, 7.2 Hz, 4H), 1.46-1.14 (m, 16H). ESI-MS, (m/z): [M+H]+, 921.

<Example 3> Preparation of [$^{99m}$Tc]Tc-15, the Compound 15 of Example 1 Labeled with $^{99m}$Tc

[$^{99m}$Tc]Tc-15 was prepared as follows according to reaction formula 2 above.

A [$^{99m}$Tc][Tc($H_2O)_3$($CO)_3$] precursor was prepared using an IsoLink kit. A kit comprising sodium tetraborate decahydrate (2.9 mg), sodium carbonate (7.8 mg), potassium sodium tartrate tetrahydrate (9.0 mg) and disodium borenocarbonate (4.5 mg) was added to $^{99m}TcO_4$— (1 mL, 555-740 MBq). The vial was heated in a heating block at 100° C. for 30 minutes and equilibrated for 10 minutes at room temperature. 1 N HCl (200 μL) was added thereto to adjust the pH to 6-6.5. Radiochemical purity was determined by radio-HPLC. The prepared [$^{99m}$Tc][Tc($H_2O)_3$($CO)_3$]$^+$ (500 μL, 370 MBq) solution was added to a vial containing a mixture of methanol and water (100 μg, 200 μL, 3:1 v/v) and compound 15. The vial was heated at 100° C. for 30 minutes and purified by radio-HPLC. The eluted fractions containing the $^{99m}$Tc-labeled conjugate were collected, diluted with water (20 mL) and then passed through a Sep-Pak C18 cartridge of ethanol (12 mL) and water (12 mL). The Sep-Pak C18 cartridge was washed with water (5 mL), and the $^{99m}$Tc labeled conjugate was eluted with ethanol (1 mL). Then, the eluent was diluted with saline for further in vitro and imaging studies.

<Example 4> Preparation of [$^{99m}$Tc]Tc-16, the Compound 16 of Example 2 Labeled with $^{99m}$Tc

[$^{99m}$Tc]Tc-16 was prepared as follows according to reaction formula 2 above.

A [$^{99m}$Tc][Tc($H_2O)_3$($CO)_3$] precursor was prepared using an IsoLink kit. A kit comprising sodium tetraborate decahydrate (2.9 mg), sodium carbonate (7.8 mg), potassium sodium tartrate tetrahydrate (9.0 mg) and disodium borenocarbonate (4.5 mg) was added to $^{99m}TcO_4$— (1 mL, 555-740 MBq). The vial was heated in a heating block at 100° C. for 30 minutes and equilibrated for 10 minutes at room temperature. 1 N HCl (200 μL) was added thereto to adjust the pH to 6-6.5. Radiochemical purity was determined by radio-HPLC. The prepared [$^{99m}$Tc][Tc($H_2O)_3$($CO)_3$]$^+$ (500 μL, 370 MBq) solution was added to a vial containing a mixture of methanol and water (100 μg, 200 μL, 3:1 v/v) and compound 16. The vial was heated at 100° C. for 30 minutes and purified by radio-HPLC. The eluted fractions containing the $^{99m}$Tc-labeled conjugate were collected, diluted with water (20 mL) and then passed through a Sep-Pak C18 cartridge of ethanol (12 mL) and water (12 mL). The Sep-Pak C18 cartridge was washed with water (5 mL), and the $^{99m}$Tc labeled conjugate was eluted with ethanol (1 mL). Then, the eluent was diluted with saline for further in vitro and imaging studies.

<Example 5> Preparation of Re-15, a Rhenium Complex of the Compound 15 of Example 1

Re-15 was prepared according to reaction formula 3.

Re($CO)_3$($H_2O)_3$]Br, a rhenium precursor, was prepared by the informed method. Bromopentacarbonyl rhenium (I) (100 mg, 0.25 mmol) was heated in deionized water (5 mL) for 24 hours to obtain [Re($CO)_3$($H_2O)_3$]Br at a concentration of 2 mg/mL. For the preparation of Re-15, [Re($CO)_3$($H_2O)_3$]Br (400 μL, 1 μmol) was added to the precursor 15 (11 mg, 0.02 mmol) in methanol (2 mL) and then heated at 1000 for 4 hours. The reaction mixture was heated at 100° C. for 3 hours. The resulting mixture was concentrated using a rotary evaporator and purified by HPLC.

<Example 6> Preparation of Re-16, a Rhenium Complex of the Compound 16 of Example 2

Re-16 was prepared according to reaction formula 3.

Re($CO)_3$($H_2O)_3$]Br, a rhenium precursor, was prepared by the informed method Bromopentacarbonyl rhenium (I) (100 mg, 0.25 mmol) was heated in deionized water (5 mL) for 24 hours to obtain [Re($CO)_3$($H_2O)_3$]Br at a concentration of 2 mg/mL. For the preparation of Re-16, [Re($CO)_3$($H_2O)_3$]Br (400 μL, 1 μmol) was added to the precursor 16 (10 mg, 0.01 mmol) in a mixture of methanol (2 mL) and water (3 mL, 1:1 v/v). The reaction mixture was heated at 100° C. for 2 hours.

The resulting mixture was concentrated using a rotary evaporator and purified by HPLC.

<Experimental Example 1> Stability Test in Human Serum

The stability test in human serum is to test the stability when it comes into contact with human serum after administration to the human body, and the stability in the body is partly tested in vitro.

1. [$^{99m}$Tc]Tc-15 According to the Present Invention

In order to examine the stability of [$^{99m}$Tc]Tc-15 according to the present invention in human serum, 3.7 MBq of [$^{99m}$Tc]Tc-15 (100 μL) prepared in Example 3 was added to 1 mL of human serum, mixed well, and then cultured at 36.5° C. with stirring. After 2 hours, the reaction mixture was analyzed by ITLC.

Figure 2A:
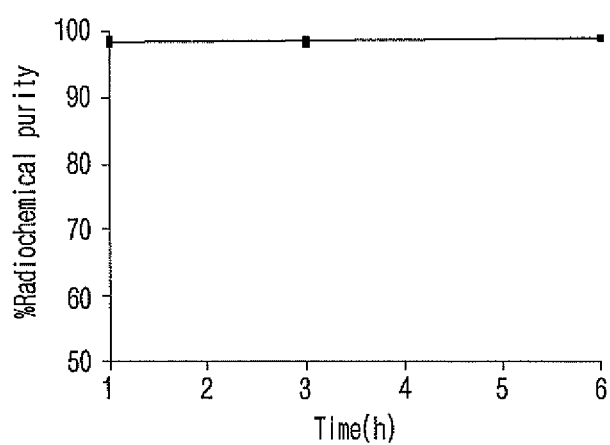
FIGS. 2A and 2B show the results of a stability test in which $[^{99m}Tc]Tc$-15 and $[^{99m}Tc]Tc$-16 according to the present invention were incubated with human serum at 37° C. for 6 hours. The results for $[^{99m}Tc]Tc$-15 and $[^{99m}Tc]Tc$-16 are shown in FIGS. 2A and 2B, respectively, and both showed stability of 98% or more even after 6 hours.

As a result, it was confirmed that most of them were present as [$^{99m}$Tc]Tc-15 and hardly separated as $^{99m}$Tc (FIG. 2A).

2. [$^{99m}$Tc]Tc-16 According to the Present Invention

In order to examine the stability of [$^{99m}$Tc]Tc-16 according to the present invention in human serum, 3.7 MBq of [$^{99m}$Tc]Tc-16 (100 μL) prepared in Example 4 was added to 1 mL of human serum, mixed well, and then cultured at 36.5° C. with stirring. After 2 hours, the reaction mixture was analyzed by ITLC.

Figure 2B:
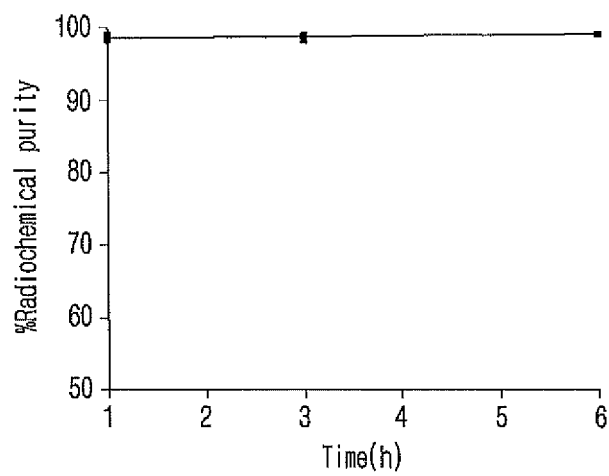

As a result, it was confirmed that most of them were present as [$^{99m}$Tc]Tc-16 and hardly separated as $^{99m}$Tc (FIG. 2B).

Therefore, [$^{99m}$Tc]Tc-15 or [$^{99m}$Tc]Tc-16 according to the present invention is stable enough to obtain images because technetium, a soft acid, and isonitrile, a soft base, bind very strongly and have excellent stability in human serum.

<Experimental Example 2> In Vitro Cell Binding Test

In order to conduct the in vitro cell binding test of [$^{99m}$Tc]Tc-15 and [$^{99m}$Tc]Tc-16 according to the present invention, the following experiment was performed.

Figure 3A:
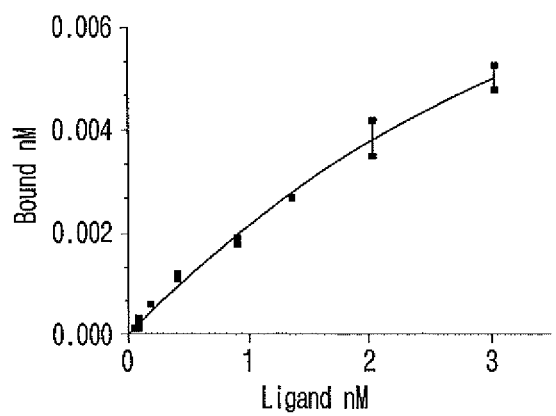
FIGS. 3A and 3B show the saturation binding curves according to the in vitro cell binding test results of $[^{99m}Tc]Tc$-15 and $[^{99m}Tc]Tc$-16 according to the present invention, respectively. As a result of calculating the Kd values of $[^{99m}Tc]Tc$-15 and $[^{99m}Tc]Tc$-16 by nonlinear regression analysis, 5.5 nM and 0.2 nM were obtained, respectively.
Figure 3B:
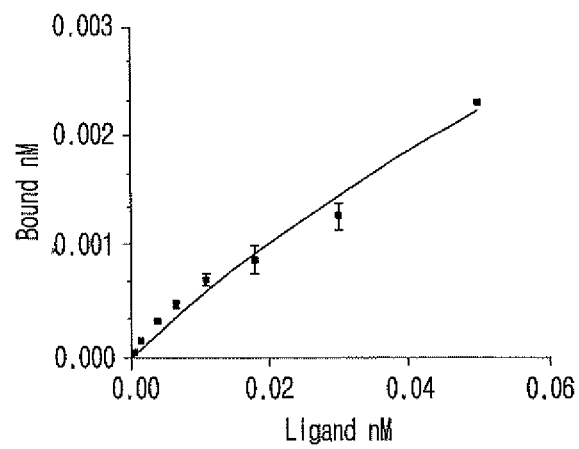

The PSMA-positive prostate cancer cell line 22Rv1 was placed in a 24-well plate at the density of 1×10$^5$ cells/well, followed by culture in a 37° C., 5% CO$_2$ incubator for 24 hours. Each of [$^{99m}$Tc]Tc-15 and [$^{99m}$Tc]Tc-16 prepared in Examples 3 and 4 were diluted with a cell culture medium containing 0.5% bovine serum albumin by sequential two-fold dilution. 0.5 mL of the diluted solution was taken and put into cultured cells and incubated in a 37° C., 5% CO$_2$ incubator for 1 hour. After removing the culture medium, the cells were washed twice with fresh culture medium, 1 mL of 0.5% sodium dodecyl sulfate (SDS) dissolved in phosphate buffered saline was added thereto, gently shaken to dissolve, and then transferred to a 5 mL disposable plastic test tube. The radioactivity of the tube was measured using a gamma counter. When [$^{99m}$Tc]Tc-15 and [$^{99m}$Tc]Tc-16 were added to measure non-specific binding, 2-(phosphonomethyl)-pentanedonic acid (PMPA) was added at a concentration of 250 μM and the same experiment was performed. Specific binding was obtained by subtracting non-specific binding from total binding, and a saturation curve was drawn. FIGS. 3A and 3B are the saturation curves for [$^{99m}$Tc]Tc-15 and [$^{99m}$Tc]Tc-16, respectively. From these saturation curves, the dissociation constant, Kd, was calculated by nonlinear regression using GraphPad Prism 7 program. As a result, the Kd values of [$^{99m}$Tc]Tc-15 and [$^{99m}$Tc]Tc-16 according to the present invention were 5.5 nM and 0.2 nM, respectively, and both showed sufficient binding force for imaging and treatment, but [$^{99m}$Tc]Tc-16 had a higher binding force among the two.

<Experimental Example 3> PET Image Verification in Cancer Transplanted Experimental Animals

[$^{99m}$Tc]Tc-15 and [$^{99m}$Tc]Tc-16 according to the present invention were administered to animals transplanted with prostate cancer and the following experiment was performed to verify cancer tissue targeting through PET imaging.

Specifically, 0.1 mL of RPMI1640 culture medium containing 5×10$^6$ 22 Rv1 cells was subcutaneously injected into the right back of a 4-week-old male BALE/c nude mouse. After 2 to 3 weeks, the present inventors confirmed that the tumor tissue had reached an appropriate size and used it in the experiment. For animal injection, [$^{99m}$Tc]Tc-15 and [$^{99m}$Tc]Tc-16 were each diluted in saline for injection to a concentration of 10.2 MBq/100 μL. Each of these was injected into the tail vein of the mice transplanted with cancer cells, and after 1 hour and 3 hours, SPECT for animals was taken for 10 minutes.

Figure 4A:
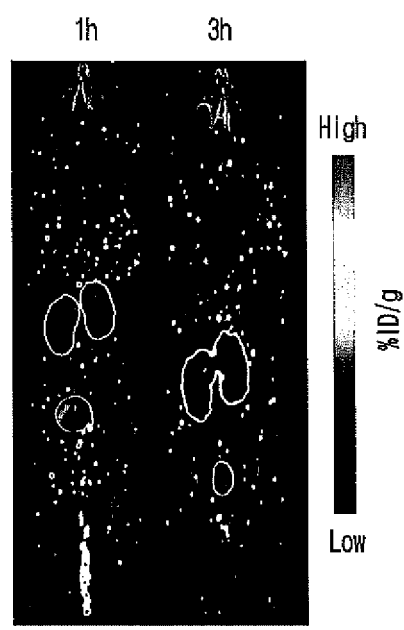
FIGS. 4A and 4B are SPECT images 1 hour and 3 hours after the intravenous injection of $[^{99m}Tc]Tc$-15 according to the present invention into 22Rv1 cell-transplanted mice.
Figure 5A:
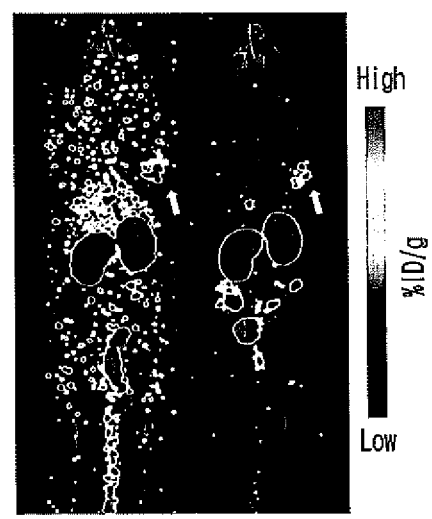
FIGS. 5A and 5B are SPECT images 1 hour and 4 hours after the intravenous injection of [$^{99m}$Tc]Tc-16 according to the present invention into 22Rv1 cell-transplanted mice.

As a result, it was observed that [$^{99m}$Tc]Tc-15 and [$^{99m}$Tc]Tc-16 according to the present invention were not only excreted by the kidney but also ingested into the prostate cancer tissue. In particular, [$^{99m}$Tc]Tc-16 showed a higher intake in prostate cancer (FIGS. 4A and 5A). The results show that the blood concentration of [$^{99m}$Tc]Tc-16, which binds to albumin, was maintained higher, and thus the intake into prostate cancer was increased.

Figure 4B:
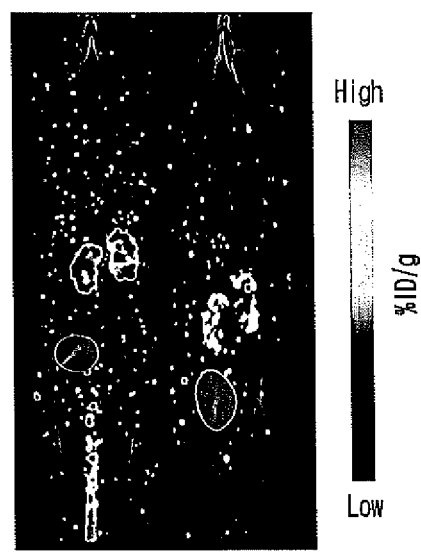
Figure 5B:
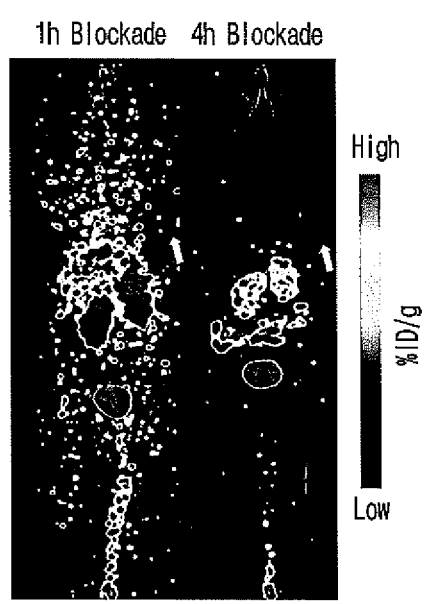

In addition, when MIP-1072 that binds to PSMA was previously injected prior to the administration of [$^{99m}$Tc]Tc-15 and [$^{99m}$Tc]Tc-16, tumor intake was not observed (FIGS. 4B and 5B). This proves that the prostate cancer images of [$^{99m}$Tc]Tc-15 and [$^{99m}$Tc]Tc-16 according to the present invention are shown by specific binding to PSMA.

Therefore, since [$^{99m}$Tc]Tc-15 and [$^{99m}$Tc]Tc-16 according to the present invention bind specifically to PSMA, they can be effectively used for imaging of prostate cancer, and it can be seen that [$^{99m}$Tc]Tc-16, which has an albumin binding site in the linker, shows a better image.

<Experimental Example 4> In Vivo Distribution Test in Cancer Transplantation Animals

[$^{99m}$Tc]Tc-15 or [$^{99m}$Tc]Tc-16 according to the present invention was administered to an animal transplanted with prostate cancer, and it was verified whether it was actually observed in cancer tissue by in vivo distribution test.

Specifically, 0.1 mL of RPMI1640 culture medium containing 5×10$^6$ 22 Rv1 cells was subcutaneously injected into the left flank of a 4-week-old male BALB/c nude mouse. After 2 to 3 weeks, the present inventors confirmed that the tumor tissue had reached an appropriate size and used it in the experiment. For animal injection, [$^{99m}$Tc]Tc-15 prepared in Example 3 and [$^{99m}$Tc]Tc-16 prepared in Example 4 were each diluted in saline for injection to a concentration of 0.74 MBq/100 μL. Each of these was injected into the tail vein of the mice transplanted with cancer cells, and after 1 hour and 4 hours, cancer, blood, muscle, heart. Lung, liver, spleen, stomach, small intestine, kidney, bone, and the like were collected and their weight and radioactivity were measured. Based on this data, the intake amount for each unit tissue (% ID/g) was calculated and shown in Tables 2 and 3.

TABLE 2

In vivo distribution rate of [$^{99m}$Tc]Tc-15 in PSMA-targeted
22Rv1 tumor bearing BALB/c male nude mice at 1 and 4 hours

| Tissues | 1 h | 4 h | 1 h Blockade | 4 h Blockade |
|---|---|---|---|---|
| Blood | 0.60 ± 0.02 | 0.31 ± 0.02 | 0.52 ± 0.09 | 0.31 ± 0.01 |
| Muscle | 0.17 ± 0.07 | 0.08 ± 0.01 | 0.11 ± 0.02 | 0.08 ± 0.01 |
| Tumor | 1.48 ± 0.18*** | 0.81 ± 0.09*** | 0.38 ± 0.12 | 0.20 ± 0.04 |
| Heart | 0.22 ± 0.02 | 0.12 ± 0.01 | 0.16 ± 0.03 | 0.10 ± 0.01 |
| Lung | 0.64 ± 0.02 | 0.30 ± 0.04 | 0.61 ± 0.20 | 0.30 ± 0.05 |
| Liver | 0.94 ± 0.05 | 0.85 ± 0.05 | 0.84 ± 0.12 | 0.84 ± 0.03 |
| Spleen | 0.90 ± 0.14 | 0.26 ± 0.06 | 0.15 ± 0.03 | 0.16 ± 0.01 |
| Stomach | 0.31 ± 0.07 | 0.15 ± 0.02 | 0.17 ± 0.04 | 0.14 ± 0.01 |
| Intestine | 0.78 ± 0.07 | 0.81 ± 0.19 | 0.55 ± 0.13 | 0.97 ± 0.20 |
| Kidney | 59.59 ± 8.45*** | 13.72 ± 5.45* | 4.22 ± 1.30 | 1.44 ± 0.09 |
| Bone | 0.34 ± 0.02 | 0.16 ± 0.03 | 0.26 ± 0.07 | 0.20 ± 0.03 |
| Tumor/blood | 2.5 ± 0.18 | 2.6 ± 0.13 | 0.73 ± 0.18 | 0.65 ± 0.13 |
| Tumor/muscle | 8.5 ± 2.80 | 10.4 ± 0.77 | 3.5 ± 0.50 | 2.71 ± 0.78 |
| Tumor/liver | 1.57 ± 0.15 | 0.96 ± 0.13 | 0.45 ± 0.10 | 0.24 ± 0.04 |
| Tumor/kidney | 0.02 ± 0.00 | 0.06 ± 0.02 | 0.09 ± 0.02 | 0.14 ± 0.03 |

Results were expressed as % ID/g (mean ± SD for n = 3).
Blocking was performed by co-injection of 2-PMPA (100 µg).
*p ≤0.001, p ≤0.01.

TABLE 3

In vivo distribution and absorption rate of [$^{99m}$Tc]Tc-16 in PSMA-
targeted 22Rv1 tumor bearing BALB/c male nude mice at 1 and 4 hours

| Tissues | 1 h | 4 h | 1 h Blockade | 4 h Blockade |
|---|---|---|---|---|
| Blood | 0.42 ± 0.01 | 0.17 ± 0.03 | 0.75 ± 0.08 | 0.15 ± 0.01 |
| Muscle | 0.13 ± 0.02 | 0.07 ± 0.01 | 0.22 ± 0.06 | 0.05 ± 0.01 |
| Tumor | 1.87 ± 0.11*** | 2.83 ± 0.26*** | 0.45 ± 0.02 | 0.39 ± 0.03 |
| Heart | 0.36 ± 0.01 | 0.25 ± 0.05 | 0.48 ± 0.05 | 0.11 ± 0.01 |
| Lung | 0.52 ± 0.05 | 0.36 ± 0.04 | 1.63 ± 0.10 | 0.45 ± 0.04 |
| Liver | 1.17 ± 0.04 | 0.69 ± 0.11 | 1.95 ± 0.07 | 1.33 ± 0.15 |
| Spleen | 3.40 ± 0.93 | 3.44 ± 0.23 | 0.40 ± 0.03 | 0.20 ± 0.04 |
| Stomach | 0.85 ± 0.23 | 0.42 ± 0.04 | 1.04 ± 0.26 | 0.23 ± 0.04 |
| Intestine | 0.47 ± 0.06 | 1.48 ± 0.18 | 0.85 ± 0.07 | 1.26 ± 0.14 |
| Kidney | 24.66 ± 2.17** | 39.65 ± 6.86*** | 5.66 ± 0.63 | 3.59 ± 0.52 |
| Bone | 0.63 ± 0.03 | 1.04 ± 0.15 | 1.16 ± 0.08 | 0.47 ± 0.12 |
| Tail | 0.49 ± 0.10 | 0.48 ± 0.12 | 1.18 ± 0.14 | 0.53 ± 0.06 |
| Tumor/blood | 4.43 ± 0.39 | 16.70 ± 1.36 | 0.61 ± 0.07 | 2.67 ± 0.25 |
| Tumor/muscle | 14.05 ± 1.78 | 40.43 ± 3.97 | 2.16 ± 0.43 | 8.44 ± 1.52 |
| Tumor/liver | 1.60 ± 0.13 | 4.17 ± 0.36 | 0.23 ± 0.02 | 0.30 ± 0.04 |
| Tumor/kidney | 0.08 ± 0.01 | 0.07 ± 0.01 | 0.08 ± 0.01 | 0.11 ± 0.01 |

Results were expressed as % ID/g (mean ± SD for n = 4).
Blocking was performed by co-injection of 2-PMPA (100 µg).
*p ≤0.001, p ≤0.01.

As shown in Tables 2 and 3, [$^{99m}$Tc]Tc-15 or [$^{99m}$Tc]Tc-1.6 according to the present invention showed the highest intake in the kidney like a conventional radiopharmaceutical for peptide imaging, followed by a high intake in the cancer tissue. However, the intake of Tc-15 in the liver and the intake of Tc-16 in the spleen appeared to be slightly higher than the intake in the cancer tissue, but none of them were statistically significant. However, the intake of [$^{99m}$Tc]Tc-15 in the liver and the intake of [$^{99m}$Tc]Tc-16 in the spleen appeared to be slightly higher than the intake in the cancer tissue, but none of them were statistically significant. In addition, as both [$^{99m}$Tc]Tc-1.5 and [$^{99m}$Tc]Tc-16 showed that the intake was decreased when PSMA was blocked with PMPA, it was found that the intake into cancer cells was specific to PSMA.

Therefore, since [$^{99m}$Tc]Tc-15 or [$^{99m}$Tc]Tc-16 according to the present invention is effective for imaging of prostate cancer, it can be effectively used as a radiopharmaceutical, and it can be seen that [$^{99m}$Tc]Tc-16 having an albumin binding site in the linker is superior.

As mentioned above, the present invention has been described in detail through the preferred preparative examples, examples and experimental examples, but the scope of the present invention is not limited to the specific examples, and should be interpreted by the appended claims. In addition, those of ordinary skill in the art should understand that many modifications and variations are possible without departing from the scope of the present invention.

INDUSTRIAL APPLICABILITY

The GUL-isonitrile derivative and radioactive metal complex according to the present invention is simple to label, has high labeling efficiency, has excellent stability in human serum when administered to the body, binds well to PSMA expressed in prostate cancer, and has high water solubility, so it is excreted by the kidney rather than the hepatobiliary tract, so the intake is very small in the intestines. In addition, the GUL-isonitrile derivative and radioactive metal complex of the present invention accumulates in prostate cancer tissue and emits radiation from the prostate cancer tumor site, so it can be effectively used as a therapeutic or diagnostic pharmaceutical composition.

What is claimed is:

1. A compound represented below or a pharmaceutically acceptable salt by formula 1 thereof:

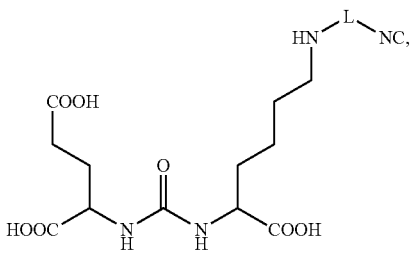   (1)

wherein L is a linker.

2. The compound or the pharmaceutically acceptable salt thereof according to claim 1, wherein the linker L is selected from the group consisting of straight or branched $C_{1-10}$ alkyl, $C_{4-10}$ aryl, urea, thiourea, triazole, monopeptide, dipeptide, tripeptide $C_{4-10}$ cycloalkyl, benzyl, halogenated benzyl, phenyl, halogenated phenyl, ether, thioether, amine, amide, ketone, ester, thioester, hydrazine, hydrazide, pentose and hexose.

3. A compound represented by formula 2a or 2b below or a pharmaceutically acceptable salt thereof:

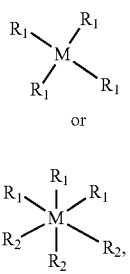

wherein in formula 2a or 2b
M is a metal,
$R_1$ is the compound of claim 1,
$R_2$ is $R_1$ or —CO, and
the binding between $R_1$ and M is via an isonitrile group of R1.

4. The compound or the pharmaceutically acceptable salt thereof according to claim 3, wherein the M is copper (Cu), technetium (Tc) or rhenium (Re).

5. The compound or the pharmaceutically acceptable salt thereof according to claim 3, wherein the M is $^{60}$Cu, $^{61}$Cu, $^{62}$Cu, $^{63}$Cu, $^{64}$Cu, $^{65}$Cu, $^{67}$Cu, $^{96}$Tc, $^{96m}$Tc, $^{97m}$Tc, $^{99m}$Tc, $^{101}$Tc, $^{186}$Re or $^{188}$Re.

6. A pharmaceutical composition for the treatment or diagnosis of prostate cancer containing the compound of claim 1 or a pharmaceutically acceptable salt thereof as an active ingredient.

7. A kit for imaging or treatment of prostate cancer, said kit comprising a pharmaceutically acceptable non-pyrogenic sterile vial containing 0.01 to 100 mg/unit dose of the compound of claim 1, a reducing agent, a buffer, an antioxidant and carbon monoxide as an adjuvant.

8. The kit for imaging or the treatment of prostate cancer according to claim 7, wherein the reducing agent is at least one selected from the group consisting of stannous chloride, cysteine, sodium borohydride, ascorbic acid or a salt thereof.

9. The kit for imaging or the treatment of prostate cancer according to claim 7, wherein the buffer is at least one selected from the group consisting of acetic acid, gluconate, glucoheptonate, phosphonate, glucarate, tartrate, succinate and citric acid.

10. The kit for imaging or the treatment of prostate cancer according to claim 7, wherein the antioxidant is at least one selected from the group consisting of ascorbic acid or gentisic acid.

11. The kit for imaging or the treatment of prostate cancer according to claim 7, wherein the kit further comprises a radioisotope, wherein radioisotope is $^{60}$Cu, $^{61}$Cu, $^{62}$Cu, $^{63}$Cu, $^{64}$Cu, $^{65}$Cu, $^{67}$Cu, $^{96}$Tc, $^{96m}$Tc, $^{97m}$Tc/$^{99m}$Tc, $^{101}$Tc, $^{186}$Re or $^{188}$Re.

12. A method of treating prostate cancer comprising administering the compound of claim 3 or a pharmaceutically acceptable salt thereof to a subject in need thereof at a concentration effective to treat prostate cancer in the subject.

13. A pharmaceutical composition for the treatment or diagnosis of prostate cancer containing the compound of claim 3 or a pharmaceutically acceptable salt thereof as an active ingredient.

14. A method of diagnosing prostate cancer in a subject, said method comprising administering the compound of claim 3 or a pharmaceutically acceptable salt thereof to the subject and detecting any absorbed compound indicative of prostate cancer tissue in the subject.

* * * * *